United States Patent
Black et al.

(10) Patent No.: US 7,308,689 B2
(45) Date of Patent: Dec. 11, 2007

(54) METHOD, APPARATUS, AND PROGRAM FOR ASSOCIATING RELATED HETEROGENEOUS EVENTS IN AN EVENT HANDLER

(75) Inventors: Steven Black, Round Rock, TX (US); Herve Debar, Louvigny (FR); John Michael Garrison, Austin, TX (US); Andreas Wespi, Mettmenhasli (CH)

(73) Assignee: International Business Machines Corporation, Armonk, NY (US)

( * ) Notice: Subject to any disclaimer, the term of this patent is extended or adjusted under 35 U.S.C. 154(b) by 1085 days.

(21) Appl. No.: 10/324,569

(22) Filed: Dec. 18, 2002

(65) Prior Publication Data

US 2004/0123304 A1    Jun. 24, 2004

(51) Int. Cl.
*G06F 13/00*    (2006.01)
(52) U.S. Cl. .................. 719/318; 709/223; 709/224
(58) Field of Classification Search ................. 719/318
See application file for complete search history.

(56) References Cited

U.S. PATENT DOCUMENTS

| | | | |
|---|---|---|---|
| 5,237,684 A | 8/1993 | Record et al. | 395/650 |
| 5,321,837 A | 6/1994 | Daniel et al. | 395/650 |
| 5,509,123 A | 4/1996 | Dobbins et al. | 395/200.15 |
| 5,612,898 A | 3/1997 | Huckins | 364/514 R |
| 5,634,010 A | 5/1997 | Ciscon et al. | 395/200.15 |
| 5,655,081 A | 8/1997 | Bonnell et al. | 395/200.32 |
| 5,721,825 A | 2/1998 | Lawson et al. | 395/200.33 |
| 5,745,693 A | 4/1998 | Knight et al. | 395/200.54 |
| 5,867,665 A | 2/1999 | Butman et al. | 395/200.68 |
| 6,119,159 A | 9/2000 | Tseng et al. | 709/224 |
| 6,215,486 B1 | 4/2001 | Walls et al. | 345/329 |
| 6,430,277 B1* | 8/2002 | Roadifer et al. | 379/127.02 |
| 6,810,367 B2* | 10/2004 | Barnard | 702/193 |
| 6,920,453 B2* | 7/2005 | Mannila et al. | 707/6 |
| 7,089,536 B2* | 8/2006 | Ueki et al. | 717/131 |
| 7,130,901 B2* | 10/2006 | Roach | 709/224 |
| 7,139,938 B2* | 11/2006 | Marwaha | 714/48 |
| 2002/0010803 A1* | 1/2002 | Oberstein et al. | 709/318 |
| 2003/0167406 A1* | 9/2003 | Beavers | 713/201 |
| 2004/0002942 A1* | 1/2004 | Pudipeddi et al. | 707/1 |
| 2004/0205773 A1* | 10/2004 | Carcido et al. | 719/318 |

\* cited by examiner

*Primary Examiner*—William Thomson
*Assistant Examiner*—Andy Ho
(74) *Attorney, Agent, or Firm*—Duke W. Yee; Jeffrey S. LaBaw; Gerald H. Glanzman

(57) ABSTRACT

An event handler is provided that associates events from heterogeneous data sources. In a first phase, incoming events are translated to vectors of event attributes. Based on the data source, implicit information about the event and its attributes may be available. This information is used to normalize the information provided by the event. Normalization actions may include renaming the attributes, deriving new attributes from given attributes, and transforming attribute value ranges. In a second phase, a determination is made as to whether two or more events are considered to be associated based on the vectors. Different vectors of core attributes may be created in order to create associations with different semantics.

19 Claims, 3 Drawing Sheets

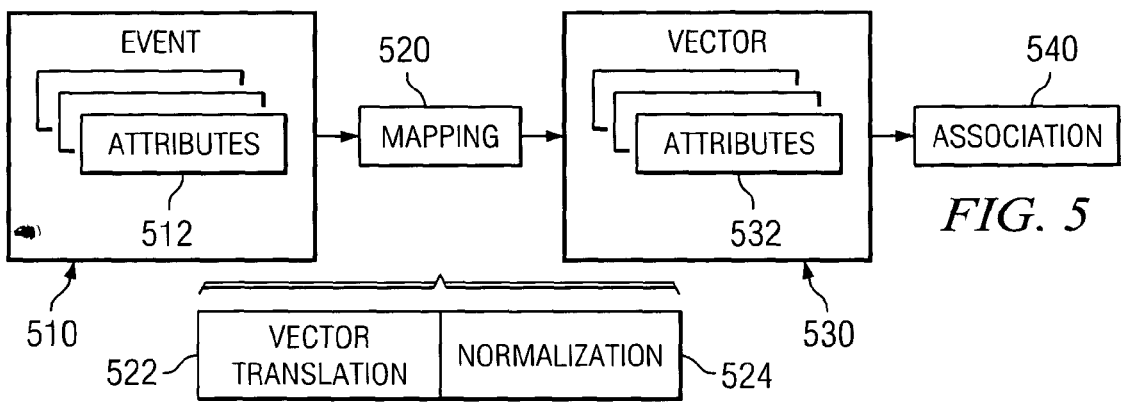
*FIG. 5*
| ATTRIBUTES | EVENT 1 | EVENT 2 | EVENT 3 | EVENT 4 | EVENT 5 |
|---|---|---|---|---|---|
| HOSTNAME | HOSTNAME1 | - | HOSTNAME3 | - | HOSTNAME5 |
| IPADDRESS | 1.2.3.4 | 3.4.3.2 | - | 9.9.9.9 | - |
| ATTACK | SCAN | DoS | DoS | DoS | TROJAN |
| SENSOR | HAXOR | HAXOR | HAXOR | HAXOR | KLAXON |
| SYSTYPE | NT | AIX | AIX | AIX | AIX |
| SEVERITY | HIGH | 48 | MEDIUM | MEDIUM | 60 |
| SOURCE | LOGFILE | SNMP | - | LOGFILE | SNMP |
*FIG. 6*
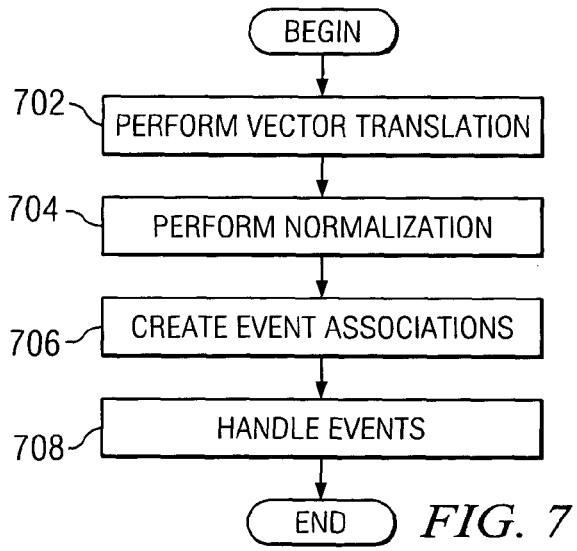
*FIG. 7*

METHOD, APPARATUS, AND PROGRAM FOR ASSOCIATING RELATED HETEROGENEOUS EVENTS IN AN EVENT HANDLER

BACKGROUND OF THE INVENTION

1. Technical Field

The present invention relates to data processing systems and, in particular, to event handlers. Still more particularly, the present invention provides a method, apparatus, and program for associating related heterogeneous events in an event handler.

2. Description of Related Art

An event management system is software that monitors servers, workstations, and network devices for routine and non-routine events. For example, routine events such as log-ons help determine network usage, while unsuccessful log-ons are warnings that crackers may be at work or that the network access system is failing. Event managers provide real-time information for immediate use and log events for summary reporting used to analyze network performance.

An event management system is typically made up of client agents that reside in the remote devices, an event handler for gathering the events, an event database, and a reporting system to deliver the results in various formats. Event handlers are typically proprietary for a particular application model and the events they receive and process tend to be homogeneous in terms of supported attributes, attribute syntax, and attribute semantics. An event handler may display events on a console, capture events and store them in a database, raise alarms when certain events are received, forward events to other event handlers, perform data reduction, and correlate related events in order to produce more meaningful results.

Event handlers become more difficult to design and implement when the events have irregular characteristics, such as different syntaxes or semantics. This often happens when an event handler must handle events generated by a variety of different types of applications, e.g., operating systems, Web servers, database servers, intrusion detection systems, antivirus software, firewalls, routers, etc. It may be very difficult to develop logic that understands the variety of events that can be received in sufficient detail to detect the relationships between different events. Again, this is particularly true when the events are received from heterogeneous data sources.

When a variety of events from different data sources is received, the events may include different attributes. Some of the events may be common across certain sets of events and other events may not be common. This makes it difficult to implement algorithms to determine when one or more events are associated in some way.

One prior art solution provides a set of adapters at the application to convert the format of information produced by the application to a standard format understood by the event handler. This is a simple mapping step and each adapter has comparatively little intelligence; an adapter only knows how to map from one format to another. However, the event handler cannot properly handle events that are not in the standard format. Every nonstandard application must be provided with an adapter. Thus, if a nonstandard application is not provided with an adapter, the events may not be handled properly or may be simply discarded.

Therefore, it would be advantageous to provide an improved mechanism for associating related heterogeneous events in an event handler.

SUMMARY OF THE INVENTION

The present invention provides an event handler that associates events from heterogeneous data sources. In a first phase, incoming events are translated to vectors of event attributes. Based on the data source, implicit information about the event and its attributes may be available. This information is used to normalize the information provided by the event. Normalization actions may include renaming the attributes, deriving new attributes from given attributes, and transforming attribute value ranges. In a second phase, a determination is made as to whether two or more events are considered to be associated based on the vectors. Different vectors of core attributes may be created in order to create associations with different semantics.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a block diagram depicting an event handler in accordance with a preferred embodiment of the present invention;

FIG. 6 is a table illustrating example events received from heterogeneous data sources in accordance with a preferred embodiment of the present invention; and FIG. 7 is a flowchart illustrating the operation of an event handler in accordance with a preferred embodiment of the present invention.

DETAILED DESCRIPTION OF THE PREFERRED EMBODIMENT

Figure 1:
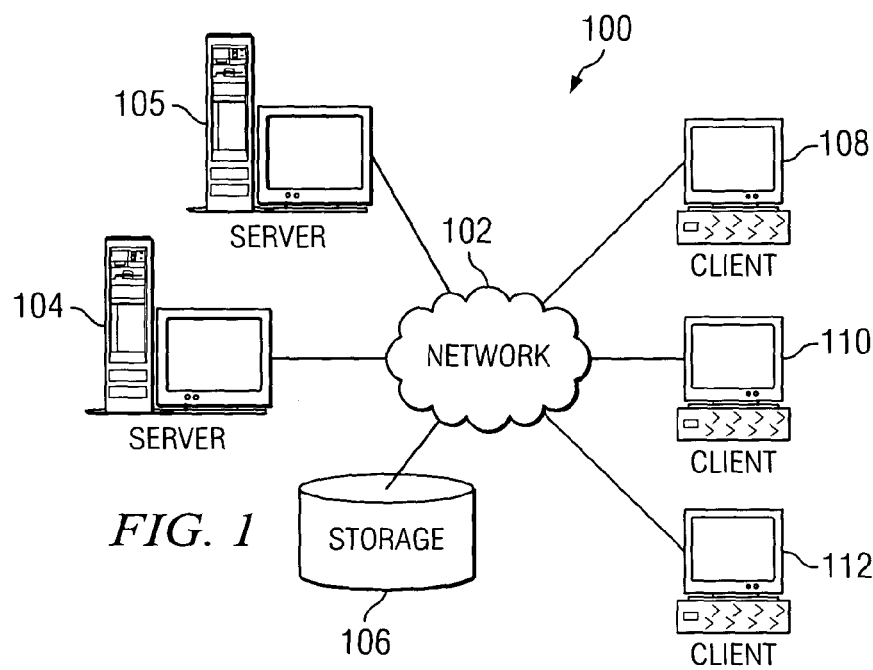
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 104, 105 are connected to network 102 along with storage unit 106. In addition, clients 108, 110, and 112 are connected to network 102. These clients 108, 110, and 112 may be, for example, personal computers or network computers. In the depicted example, servers 104, 105 provides data, such as boot files, operating system images, and applications to clients 108-

112. Clients 108, 110, and 112 may clients, for example, to server 104. Network data processing system 100 may include additional servers, clients, and other devices not shown.

In accordance with a preferred embodiment of the present invention, an event management system is deployed in network data processing system 100. As an example, event generators may be deployed in clients 108, 110, 112. An event handler may be deployed in server 104 and receive events from the event generators deployed in the clients. As a further example, an event generator may be deployed in server 105 as well. In another example, the event handler may be deployed in one of clients 108, 110, 112.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
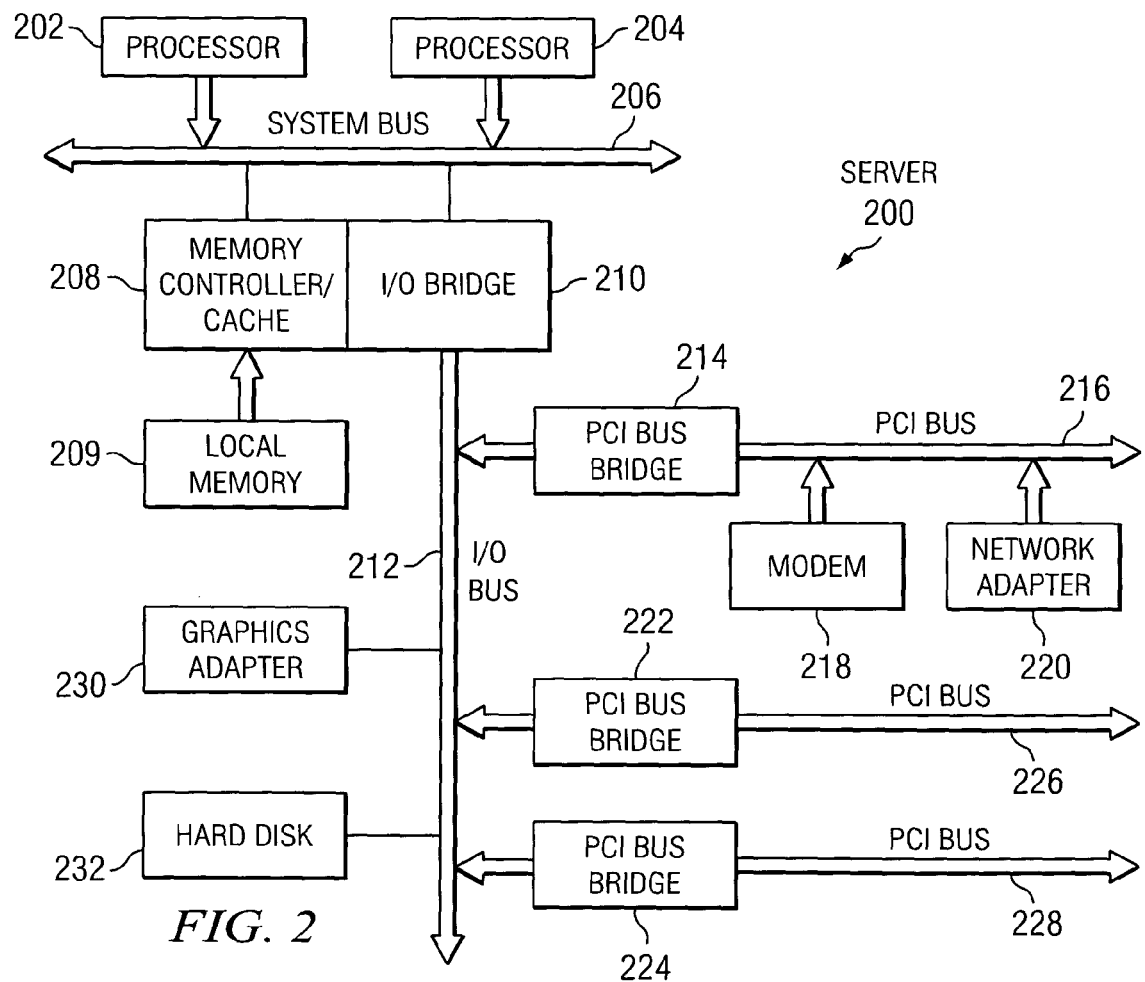
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
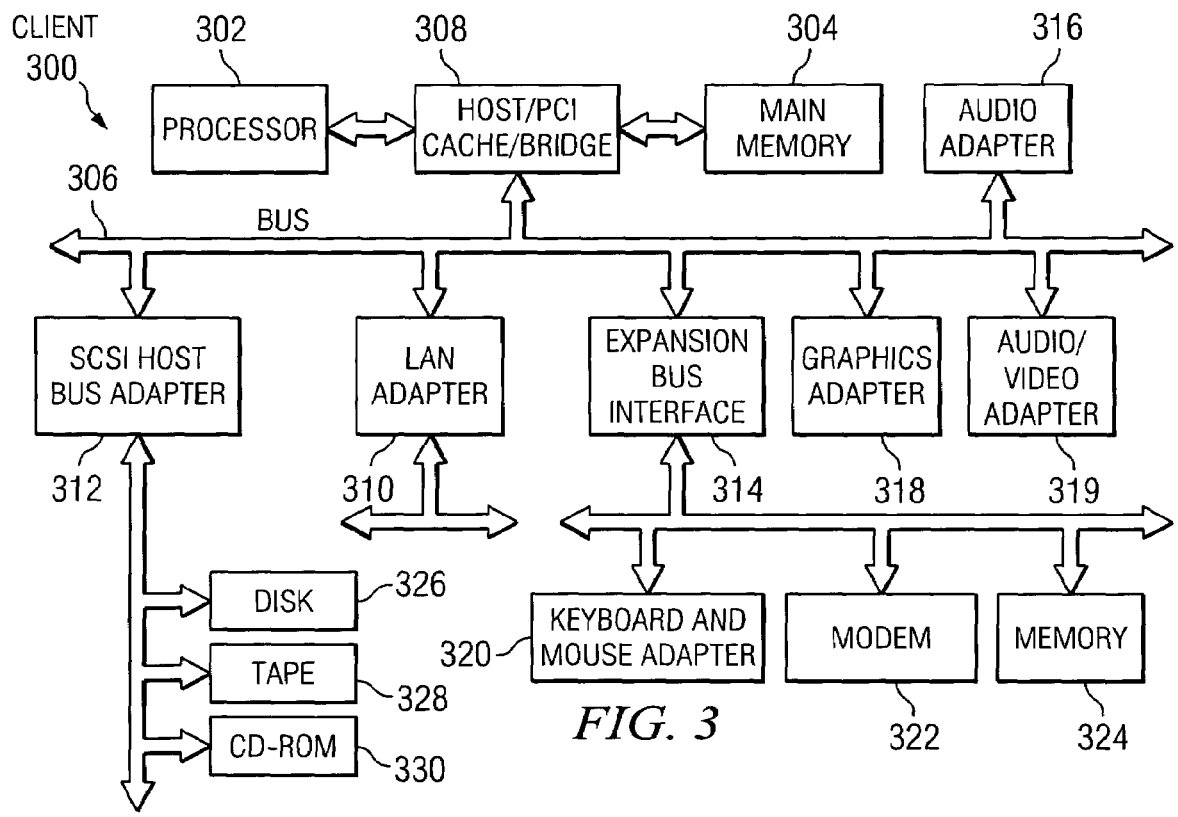
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Returning to FIG. 1, the event handler may display events on a console, capture events and store them in a database such as database 106, raise alarms when certain events are received, forward events to other event handlers, perform data reduction, and correlate related events in order to produce more meaningful results. An association may mean different things, depending on the event semantic and the objective of the event handler. The purpose of creating an association between two events may be to detect unlike events that are considered semantically equivalent and can, thus, be treated as duplicates or otherwise related in terms of further processing. Another reason to create an association between two or more events may be to correlate many raw events and to perform meaningful data reduction. The purpose of the data reduction is to convert a large number of raw events into a small number of high-level meaningful events. Data reduction may reduce information overload in large, complex environments.

Figure 4:
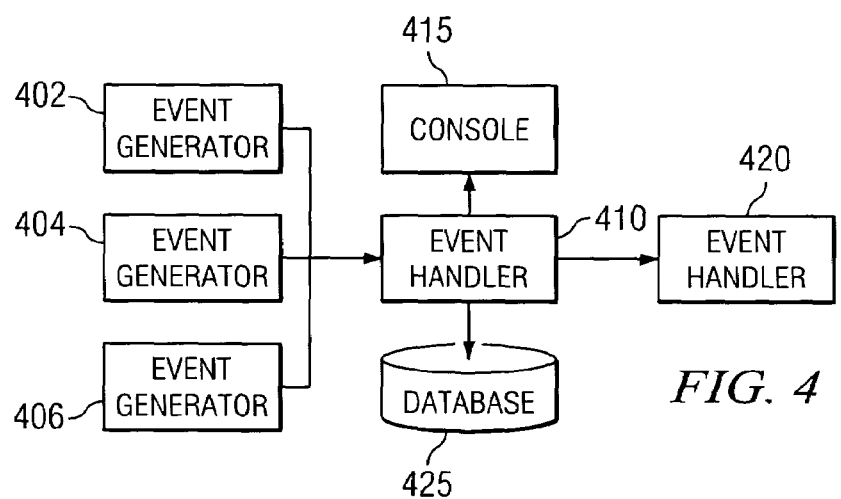
FIG. 4 is a block diagram of an event management system in accordance with a preferred embodiment of the present invention.

With reference to FIG. 4, a block diagram of an event management system is illustrated in accordance with a preferred embodiment of the present invention. The event management system includes event generators 402, 404, 406 and event handler 410. The event generators may be from heterogeneous data sources, such as different operating systems, Web servers, database servers, intrusion detection systems, antivirus software, firewalls, and routers.

Event handler 410 may display events on consoles, such as console 415, or capture events and store them in a database, such as database 425. The event handler may also raise alarms when certain types of events are received. An alarm may comprise sending an e-mail message or paging an administrator. Furthermore, the event handler may map received events into alternative formats and forward the mapped events to other event handlers, such as event handler 420.

Due to heterogeneous event generators 402, 404, 406, the event handler logic becomes difficult to design because of irregular characteristics. In accordance with a preferred embodiment of the present invention, the event handler includes a mapping mechanism that performs vector translation and normalization to map incoming events from heterogeneous data sources into vectors of core attributes.

Turning now to FIG. 5, a block diagram is shown depicting an event handler in accordance with a preferred embodiment of the present invention. The event handler illustrated in FIG. 5 may be implemented as hardware or software or a combination of hardware and software. The event handler receives event 510 that includes attributes 512. Mapping 520 maps event 510 to vector 530 that includes attributes 532. Vector 530 may then be associated with other events by association 540.

Mapping 520 includes vector translation 522 and normalization 524. When an event is received, its attributes are mapped to the vector of event attributes by vector translation 522. Based on the data source, implicit information about the event and its attributes may be available. Normalization 524 uses this information to normalize the information provided by the event. Normalization actions may include, but are not limited to, renaming the attributes, deriving new attributes from given attributes, and transforming attribute value ranges.

As an example, one event generator may produce events with attributes called "name" and another event generator may produce events with attributes called "host." In both cases, the value associated with these two differently named attributes represent fully-qualified hostnames. Both attributes can be renamed to "hostname" to match the hostname attribute contained in the vector of core attributes.

As another example, one event generator may create attributes of the form "address=23.76.422.99" while another event generator creates semantically equivalent attributes of the form "hostname=abc.def.com." In this case, the vector of event attributes can contain both the address and hostname attributes, and if an event specifies only the hostname or only the address attribute, then the missing attribute is automatically derived from the given attribute. For example, normalization 522 may consult a domain name server (DNS) to receive the address, when given the hostname, or vice versa.

In a further example, one event generator may create a severity attribute with severity levels from one to six and another event generator produces severity levels ranging only from one to three. If the severity attribute of the vector has a data range from zero to one hundred, the data range transformations of {1, 2, 3, 4, 5, 6} to {0, 20, 40, 60, 80, 100} and {1, 2, 3} to {0, 50, 100}, respectively, may be applied. Other examples may also apply. For example, if an attribute value contains letters, capital letters can be translated to lower case letters so that later on attributes may be easily checked for equality.

Association 540 determines whether two or more events are considered to be associated. Events may be associated if they meet predefined criteria in terms of containing the required attributes. For example, events may be associated if they contain all of the core attributes. Events may also be associated if they contain 75% of the core attributes (not necessarily the same set of attributes in each event). In this case, default values may be assigned to missing attributes. As yet another example, events may be associated if they contain 100% of a specific subset of core attributes and 50% of a different subset of core attributes. Again, default values may be assigned to missing attributes.

Association 540 may also associate events if the values of each of the core attributes are the same, or otherwise satisfy one or more predefined matching rules. For example, events may be associated if the compared attribute values match on equality. Events may also be associated if the compared attribute values match on equality, where a normalization function is implemented before the comparison. The attribute value comparison may also be based on a computed function. A computed function may be an approximate match, where the two values are approximately the same. As another example, a computed function may also be a phonetic match, where strings sound the same when verbalized. These computed functions may range from very basic algorithms to very complex algorithms.

With reference now to FIG. 6, a table illustrating example events received from heterogeneous data sources is shown in accordance with a preferred embodiment of the present invention. As an example, the set of core attributes consists of an "Attack" attribute, a "Sensor" attribute, and a "SysType" attribute.

When comparing any two events in order to determine if they can be associated, a check is made to determine if both events contain the three specified core attributes. If all core attributes are present, a check is made to determine if the values are the same for the three core attributes. If this is the case, then the two events are considered to be associated. In the example shown in FIG. 6, event 2, event 3, and event 4 are considered to be associated, because all of the events share the same values for the three core attributes. The values associated with non-core attributes are ignored for the purposes of creating associations.

Different vectors of core attributes may be created in order to create associations with different semantics. For example, given the example events in FIG. 6, an event handler that displays alarms based on the number of high severity events received from a particular type of operating system. In this case, the event handler may associate events that have "SysType" and "Severity" as core attributes. Whenever two events have the same values for these two core attributes and severity is high, the alarm on the console for the particular association is adjusted to reflect a change in status. For example, the color of the alarm icon may be changed to red to indicate a threshold has been crossed. It does not matter if the raw events are generated by different software components or include different information, as long as the core attributes are present and satisfy the matching rules.

As another example, an event handler may be designed to receive attack alarms from a variety of different types of intrusion detection sensors. One of the features of the event handler may be to aggregate information on a graphical user interface (GUI), based on the host that launched the attack, the type of attack, and the severity of the attack. In this case, the vector of core attributes would include "IPAddress," "Attack," and "Severity." Events that do not include all three core attributes and have matching values are ignored for the purposes of maintaining the aggregation on the GUI.

In this example, the event handler would manage the events according to the following steps:
Event 1: Receive event.
  Determine that for a source of "Logfile," the IPAddress, Attack, and Severity attributes are included and normalized.
Event 2: Receive event.
  Determine that for a source of "SNMP," the IPAddress, Attack, and Severity attributes are included and the Severity attribute must be normalized.
  Determine that the Severity attribute is on a scale of zero to one hundred for the "SNMP" source and normalize the value of "48" to "Medium."
  Determine that Event 1 and Event 2 are not associated because the Attack attribute and the Severity attribute are not equal for the two events.
Event 3: Receive event.
  Determine that for the unknown source, the IPAddress is not included and the Attack and Severity attributes are normalized. Look up IPAddress in DNS using Hostname attribute.
  Determine that Event 2 and Event 3 are associated because the Attack and Severity attributes are equal.
Event 4: Receive event.
  Determine that for a source of "Logfile," the IPAddress, Attack, and Severity attributes are included and normalized.
  Determine that Event 2, Event 3, and Event 4 are associated because the Attack and Severity attributes are equal.
Event 5: Receive event.
  Determine that for a source of "SNMP," the IPAddress, Attack, and Severity attributes are included and the Severity attribute must be normalized.
  Determine that the Severity attribute is on a scale of zero to one hundred for the "SNMP" source and normalize the value of "60" to "Medium."
  Determine that Event 5 is not associated with any other event because the Attack attribute is not equal to any other event.

Next, with reference to FIG. 7, a flowchart illustrating the operation of an event handler is shown in accordance with a preferred embodiment of the present invention. The process begins when an event is received. The process performs vector translation (step 702) and performs normalization (step 704). Next, the process creates event associations (step 706). Thereafter, the process handles the events (step 708) and ends.

Thus, the present invention solves the disadvantages of the prior art by providing an event handler that associates events from heterogeneous data sources. In a first phase, incoming events are translated to vectors of event attributes. Based on the data source, implicit information about the event and its attributes may be available. This information is used to normalize the information provided by the event. Normalization actions may include renaming the attributes, deriving new attributes from given attributes, and transforming attribute value ranges. In a second phase, a determination is made as to whether two or more events are considered to be associated based on the vectors. Different vectors of core attributes may be created in order to create associations with different semantics. The present invention is an approach that is easy to implement, yet provides a mechanism for creating associations between many events that are received from different data source and do not always have the same attributes.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMS, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing heterogeneous events in an event handler, comprising:
  receiving a plurality of events from a plurality of heterogeneous event generators, wherein each event has a respective set of event attributes:
  translating the plurality of events into a plurality of vectors of core attributes;
  normalizing values of the core attributes in the plurality of vectors; and
  creating an association between a first event and a second event based on the normalized attribute values in the vectors, wherein the step of creating an association comprises:

determining whether the first event and the second event both include a required number of the core attributes; and determining whether the values of the core attributes for the first event and the second event match.

2. The method of claim 1, wherein the step of normalizing the values of core attributes comprises renaming at least one event attribute.

3. The method of claim 1, wherein the step of normalizing the values of core attributes comprises deriving at least one core attribute from a related event attribute.

4. The method of claim 1, wherein the step of normalizing the values of core attributes comprises transforming a value range of at least one event attribute to comply with a core attribute value range.

5. The method of claim 1, wherein the step of determining whether the first event and the second event both include a required number of core attributes comprises:

determining whether the first event and the second event both include a predetermined number of the core attributes.

6. The method of claim 1, wherein the step of determining whether the first event and the second event both include a required number of core attributes comprises:

determining whether the first event and the second event both include a first predetermined number of a first subset of the core attributes and a second predetermined number of a second subset of the core attributes.

7. The method of claim 1, wherein the step of determining whether the values of the core attributes for the first event and the second event match comprises:

determining whether the values of the core attributes for the first event and the second event are equal.

8. The method of claim 1, wherein the step of determining whether the values of the core attributes for the first event and the second event match comprises:

determining whether the values of the core attributes for the first event and the second event match based on a computed function.

9. The method of claim 8, wherein the computed function comprises one of an approximation function and a phonetic function.

10. An apparatus for managing heterogeneous events in an event handler, comprising:

receipt means for receiving a plurality of events from a plurality of heterogeneous event generators, wherein each event has a respective set of event attributes;

translation means for translating the plurality of events into a plurality of vectors of core attributes;

normalization means for normalizing values of the core attributes in the plurality of vectors; and creation means for creating an association between a first event and a second event based on the normalized attribute values in the vectors, wherein the creation means comprises:

first determination means for determining whether the first event and the second event both include a required number of the core attributes; and second determination means for determining whether the values of the core attributes for the first event and the second event match.

11. The apparatus of claim 10, wherein the normalization means comprises means for renaming at least one event attribute.

12. The apparatus of claim 10, wherein the normalization means comprises means for deriving at least one core attribute from a related event attribute.

13. The apparatus of claim 10, wherein the normalization means comprises means for transforming a value range of at least one event attribute to comply with a core attribute value range.

14. The apparatus of claim 10, wherein the first determination means comprises:

means for determining whether the first event and the second event both include a predetermined number of the core attributes.

15. The apparatus of claim 10, wherein the first determination means comprises:

means for determining whether the first event and the second event both include a first predetermined number of a first subset of the core attributes and a second predetermined number of a second subset of the core attributes.

16. The apparatus of claim 10, wherein the second determination means comprises:

means for determining whether the values of the core attributes for the first event and the second event are equal.

17. The apparatus of claim 10, wherein the second determination means comprises:

means for determining whether the values of the core attributes for the first event and the second event match based on a computed function.

18. The apparatus of claim 17, wherein the computed function comprises one of an approximation function and a phonetic function.

19. A computer program product, in a recordable-type computer readable medium, for managing heterogeneous events in an event handler, comprising:

instructions for receiving a plurality of events from a plurality of heterogeneous event generators, wherein each event has a respective set of event attributes;

instructions for translating the plurality of events into a plurality of vectors of core attributes;

instructions for normalizing values of the core attributes in the plurality of vectors and instructions for creating an association between a first event and a second event based on the normalized attribute values in the vectors:

wherein the instructions for creating an association comprises:

instructions for determining whether the first event and the second event both include a required number of the core attributes; and instructions for determining whether the values of the core attributes for the first event and the second event match.

* * * * *